United States Patent
Kirchhoff et al.

(10) Patent No.: US 8,505,561 B2
(45) Date of Patent: Aug. 13, 2013

(54) APPARATUS FOR CLEANING BULK MATERIAL

(75) Inventors: Timm Kirchhoff, Westerholz (DE); Arne Haase, Harrislee (DE)

(73) Assignee: Krones AG (DE)

( * ) Notice: Subject to any disclaimer, the term of this patent is extended or adjusted under 35 U.S.C. 154(b) by 493 days.

(21) Appl. No.: 12/255,175

(22) Filed: Oct. 21, 2008

(65) Prior Publication Data

US 2009/0101169 A1 Apr. 23, 2009

(30) Foreign Application Priority Data

Oct. 22, 2007 (DE) .......................... 10 2007 050 693
Jul. 26, 2008 (DE) .......................... 10 2008 034 935

(51) Int. Cl.
*B08B 3/00* (2006.01)

(52) U.S. Cl.
USPC ........................................................ 134/132

(58) Field of Classification Search
None
See application file for complete search history.

(56) References Cited

U.S. PATENT DOCUMENTS 4,073,661 A * 2/1978 Buzga et al. .................. 241/20
4,265,544 A * 5/1981 Banno et al. ................ 356/427

FOREIGN PATENT DOCUMENTS

| DE | 2346977 | 4/1975 |
|---|---|---|
| DE | 2835252 | 2/1980 |
| DE | 4337206 | 3/1995 |
| WO | 9634729 | 11/1996 |
| WO | 0076681 | 12/2000 |

OTHER PUBLICATIONS

Wuensch et al., Mar. 1995, DE 4337206, English machine translation.*
International Search Report dated, Mar. 30, 2010 issued in corresponding International Application No. EP08167204.
Office Action dated Jul. 13, 2011, issued in corresponding Chinese Application No. 2008101706327.
Translation of Chinese Office Action Issued Dec. 13, 2012 for Chinese Patent Application No. 2008101706327.

* cited by examiner

*Primary Examiner* — Michael Barr
*Assistant Examiner* — Jason Ko
(74) *Attorney, Agent, or Firm* — Onello & Mello, LLP

(57) ABSTRACT

Embodiments of the invention relate to an apparatus for cleaning bulk material, comprising a container for receiving the bulk material, a filling opening which is arranged in an upper region of the container, at least one stirring device which is arranged in the interior of the container and such that it can rotate with respect to the container, and at least one discharge device via which the bulk material can be removed from the container, wherein the discharge device is arranged below the filling opening. According to the embodiments of the invention, at least one feed is provided, via which a cleaning liquid can be introduced into the container, wherein the feed is arranged above the discharge device.

17 Claims, 1 Drawing Sheet

APPARATUS FOR CLEANING BULK MATERIAL

RELATED APPLICATIONS

Figure 1:
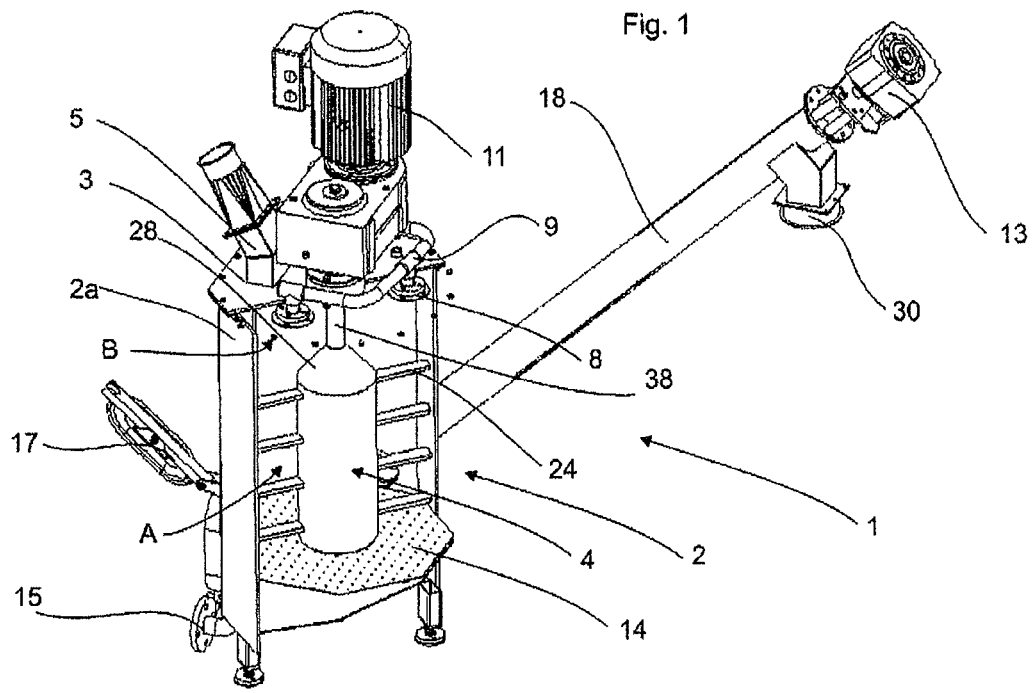

This application relies for priority upon German Patent Application No. 10 2007 050 693.9, filed on Oct. 22, 2007, and German Patent Application No. 10 2008 034 935.6, filed on Jul. 26, 2008, the contents of which are herein incorporated by reference in their entirety.

DESCRIPTION

The invention relates to an apparatus for cleaning bulk material. When recycling containers and in particular plastic containers, it is customary firstly to shred these plastic containers and thereafter to clean the shredded parts in order then to feed them to a recycling process. For this, installations are known which, by means of circulating devices, circulate the bulk material located in a container and in this way, as a result of abrasion, remove any dirt located on the individual parts, such as label residues and the like.

These installations operate in a partially satisfactory manner but do not allow complete or substantially complete cleaning of the individual particles. The object of the present invention is therefore to provide an apparatus and a method for cleaning bulk material which allows an efficient and substantially complete cleaning of this bulk material.

This is achieved according to the invention by an apparatus according to claim 1 and a method according to claim 12. Advantageous embodiments and further developments form the subject matter of the dependent claims.

An apparatus according to the invention for cleaning bulk material comprises a container for receiving the bulk material. This container comprises a filling opening which is arranged in an upper region of the container, and at least one stirring device which is arranged in the interior of the container and such that it can rotate with respect to the container. Also provided is at least one discharge device via which the bulk material can be removed from the container, wherein this discharge device is arranged below the filling opening.

According to the invention, at least one feed is provided, via which a cleaning liquid can be introduced into the container, wherein this feed is arranged above the discharge device.

The bulk material comprises in particular, but not exclusively, particles and in particular flakes which are produced during the processes of recycling PET bottles. However, it would also be possible to clean other bulk material accordingly using the apparatus according to the invention. In the apparatus according to the invention, both a wet cleaning for example using a lye and also a cleaning process brought about by friction and thus as a result of the stirring device take place. In this way, a particularly efficient cleaning of the bulk material can be achieved by the combination of the two processes.

Preferably, bulk material is introduced into the container through the filling opening. More specifically, this bulk material or the flakes are filled into the container via the filling opening, which is preferably arranged in a lid of the container. The bulk material is then wetted with liquid and in particular with hot liquid from above via nozzles. The temperature of this hot washing liquid is between 60° and 98°, preferably between 70° and 95° and particularly preferably between 80° and 95°. In this way, a combined mechanical and chemical intensive cleaning can be carried out under the effect of temperature and washing liquid, for example by means of lye and additives.

By means of the stirring device, the bulk material is circulated inside the container, preferably is circulated in a horizontal plane, and in this way paper or residues of labels can be separated from the bulk material by friction. A vertical circulation is avoided since otherwise the correct residence time in the container cannot be ensured. For reasons of reproducibility of the cleaning operation, the container is preferably a so-called "FiFo buffer", i.e. a "first-in-first-out buffer", in which those particles which were introduced first into the container are also the first to be removed therefrom.

In a further preferred embodiment, provided inside the container is a filter device which substantially retains the bulk material. However, the cleaning liquid or the cleaning liquid which has by now been made dirty by the cleaning process can pass through this filter device. The aforementioned discharge device is preferably arranged above the filter device in order to discharge the bulk material from the container.

In a further advantageous embodiment, the discharge device comprises a worm conveyor which conveys the bulk material. Furthermore, the discharge device comprises an opening provided in a side wall of the container. This worm conveyor directly adjoins said opening in the side wall of the container and conveys the bulk material outwards and preferably also upwards at an angle. By means of this worm conveyor and the operating speed thereof, it is also possible to influence the residence time of the bulk material in the apparatus.

In a further advantageous embodiment, the stirring device comprises a plurality of stirring elements extending in a radial direction of the container. These stirring elements may be designed as wing-like structures which extend in a radial direction of the apparatus. The bulk material is thus conveyed within the container from top to bottom and is cleaned during this conveying process.

Typical residence times for the bulk material inside the container are between 10 minutes and 20 minutes, preferably in the region of 15 minutes. The rotational speed of the stirring device is between 40 revolutions per minute and 100 revolutions per minute, preferably between 50 revolutions per minute and 90 revolutions per minute and particularly preferably between 60 revolutions per minute and 80 revolutions per minute. By means of this slowly rotating stirring device or the slowly rotating stirring mechanism, mechanical energy is introduced into the bulk material. The bulk material is cleaned of surface dirt as a result of friction against the wall of the container and against other particles of bulk material.

Preferably, a plurality of said stirring blades are arranged one above the other inside the container.

In a further advantageous embodiment, no stirring blades are provided in an upper region of the container and particularly preferably this upper region of the container is between 15% and 50%, preferably between 20% and 40% and particularly preferably between 30% and 40% of the volume (above the filter device) of the container. This upper region of the container (which is designed without stirring tools) acts here as a pre-cleaning zone and also serves for pre-heating the material. The other regions of the container, in which the stirring tools are arranged, are designed as an intensive cleaning zone. The material filling level inside the container is approximately 80%, wherein the introduction of mechanical energy through the material column is assisted by the stirring device.

In a further advantageous embodiment, the container has a polygonal cross section. This polygonal cross section serves as a flow breaker device so as to prevent any rotation of the mixture consisting of the liquid and the bulk material by the stirring device. In addition, additional flow breakers may be provided for example between the stirring blades of the stirring device.

By providing a polygonal cross section, regions are obtained which cannot be reached by the stirring blades, and in this way flows can thus be prevented.

In a further advantageous embodiment, a control device is provided which ensures that a filling level of the liquid inside the container is between 20% and 70%, preferably between 30% and 60% and particularly preferably between 40% and 50%.

By combining the parameters time, temperature, lye and mechanics, even so-called hot-melt adhesives are dissolved. A high circulating power of the washing lye ensures an effective discharge of dirt from the apparatus and also prevents the bulk material, i.e. the plastic flakes, from becoming dirty again. In a further advantageous embodiment, provided below the filter device is an outlet opening, via which cleaning liquid can be removed from the container.

More specifically, the washing lye that has become dirty can be sucked out of the actual washing zone through a base plate and then preferably purified again via an external multi-stage purification device. For this purification, there may be provided for example a sieving machine for removing label pulp and coarse impurities, and a membrane filtration for separating out adhesive residues and other decomposition products. The washing lye is then preferably transported or driven in a circuit into a storage tank via an external temperature control system.

More specifically, the cleaning liquid passes from the apparatus according to the invention into a sieving machine for filtering out coarse impurities. This sieving machine is adjoined by a second workup of the liquid and then one or more heating devices for heating the cleaning liquid. During this heating process, metered amounts of acids, lyes, detergents and/or defoamers may also be added. The lye used may be e.g. NaOH.

The abovementioned control device also serves for controlling the filling level of the material or bulk material and of the washing lye by means of a minimum/maximum control. This ensures that both the filling level of the washing liquid and that of the bulk material always lie within predefined limits. As mentioned above, the residence time of the bulk material inside the apparatus is influenced by a discharge worm.

In a further advantageous embodiment, the stirring device has a transition section which widens from top to bottom. Here, account must be taken of the fact that the deeper the level of bulk material inside the apparatus, the greater the volume of liquid. This reduced viscosity is compensated by the transition section which widens from top to bottom and the resulting reduced distance between the wall of the container and the outer circumference of the stirring device.

The present invention also relates to a method for cleaning bulk material. In a first step, the bulk material is introduced into the container, wherein the bulk material is introduced via a filling opening which is provided in an upper region of the container. Furthermore, the bulk material is circulated inside the container by means of a stirring device, and finally the bulk material is discharged from the container by means of a discharge device. According to the invention, the bulk material is acted upon by a cleaning liquid inside the container. Also in the method according to the invention, therefore, the bulk material is conveyed from top to bottom inside the container.

In a further advantageous embodiment, the cleaning liquid is fed to the container from above and in particular through the lid of the container.

In a further advantageous method, the cleaning liquid is separated from the bulk material by means of a filter device. The cleaned bulk material can thus be discharged for example via a worm conveyor device, and the cleaning liquid itself can be removed again from the container and recycled.

The cleaned bulk material is preferably removed from the container by means of a worm conveyor. Advantageously, an apparatus of the type described above is used for the method according to the invention.

Figure 2:
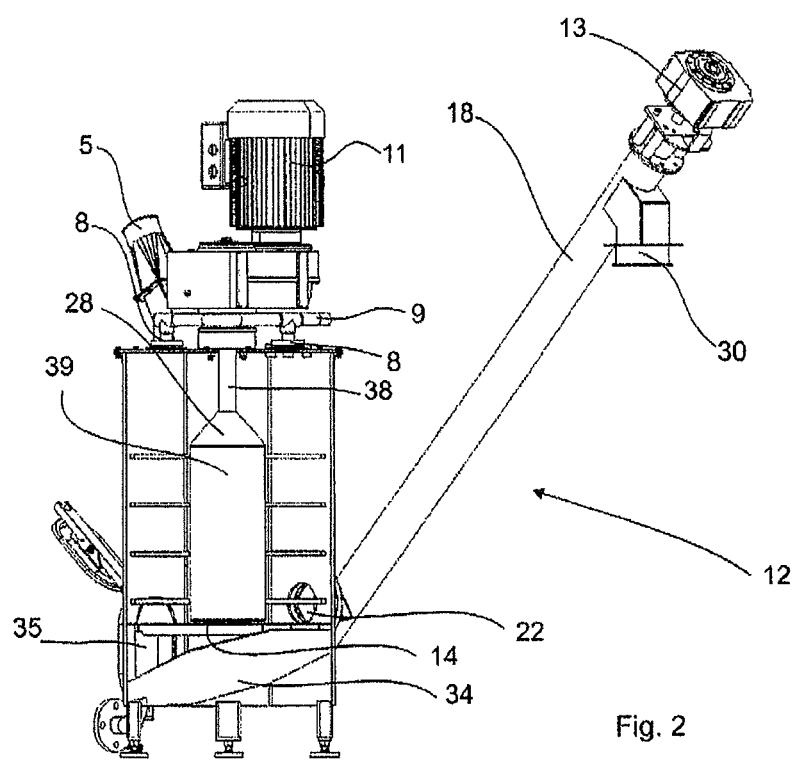

Further advantages and embodiments will emerge from the appended figures, in which:

FIG. 1 shows a first schematic diagram of an apparatus according to the invention for cleaning bulk material; and FIG. 2 shows a further view of the apparatus of FIG. 1.

FIG. 1 shows an apparatus 1 according to the invention for cleaning bulk material. This apparatus 1 comprises a container 2, inside which the bulk material (not shown) is conveyed in the vertical direction, more specifically from top to bottom. More specifically, the bulk material is introduced into the container 2 via a filling opening 5. This filling opening 5 is arranged in a lid 3 of the container 2. Located inside the container 2 is a stirring device 4 which comprises a plurality of stirring blades 24 which rotate about a longitudinal axis L of the stirring mechanism which at the same time is also a longitudinal axis L of the apparatus 1. It can be seen that the stirring blades 24 are provided only in a lower region A of the container, but not in an upper region B of the container. This stirring device 4 is driven by a drive device 11, wherein the drive takes place here from above via a drive shaft 38.

Furthermore, in the embodiment shown in FIG. 1, the stirring device 4 is mounted opposite a filter device 14, and no further components of the stirring device are provided below this filter device 14. A cleaning liquid, in particular a lye having an $OH^-$ ion content of 1.5 to 2%, is fed to the container via a plurality of feeds 8. For this purpose, a pipeline 9 is provided which supplies the individual feeds 8. These feeds 8 arranged on the lid 3 are nozzles which wet the bulk material as uniformly as possible. It can be seen from the design of the filter device 14 that the container 2 is also not circular but rather is of a polygonal shape, in the case of the embodiment shown in FIG. 1 an octagonal shape. In this way, it is possible to prevent undesired movements of the bulk material triggered by the stirring device 4.

Reference 28 denotes a transition section in which the stirring device widens from the shaft 38 towards a cylindrical rotating body 39. The stirring blades 24 are arranged on this rotating body 39.

Reference 15 denotes an outlet for the escape of liquid.

The bulk material is removed from the container via a discharge device, which is denoted in its entirety by reference 12. This discharge device 12 comprises a worm conveyor 18 which is in turn driven by a motor 13. Finally, the bulk material is output from the apparatus 1 via an outlet channel 30 and is preferably passed into a further cleaning unit such as a discharge container for example.

Reference 17 denotes a cover which can be opened in order to remove dirt residues from the container 2.

Only 8 stirring blades are illustrated in the embodiment shown in FIG. 1, but it would also be possible to provide a number of stirring blades which extend for example perpendicular to the stirring blades 24 shown in FIG. 1.

FIG. 2 shows a further view of the apparatus of FIG. 1. A plurality of feeds 8 can also be seen here, via which the washing liquid is fed to the container 2. It can also be seen that an outlet aid 34 in the form of a plate 34 lying at an angle is provided below the filter device 14 and facilitates the removal of dirt below the filter. More specifically, dirt is forced by this outlet aid towards an opening 35 which is accessible once the cover 17 has been opened.

This opening 35 also extends to a certain extent above the filter device 14, so that bulk material can also be discharged via this opening 35.

In addition, it would be possible to provide a plurality of these openings 35 in order to be able to gain access to the apparatus from various regions. Provided between the filter device 14 and the rotating body 39 is a bearing device for mounting the rotating body 39 such that it can rotate.

The discharge opening 22 is provided directly above the filter device 14 so that the bulk material is also partially pressed through this discharge opening 22 into the worm conveyor 18 and in this way can be conveyed more easily. The discharge opening is arranged in a wall section 2a of the container 2.

All of the features disclosed in the application documents are claimed as essential to the invention in so far as they are novel individually or in combination with respect to the prior art.

The invention claimed is:

1. Apparatus for cleaning bulk material, comprising a container for receiving the bulk material, a filling opening which is arranged in an upper region of the container, at least one stirring device which is arranged in the interior of the container and such that it can rotate with respect to the container, and at least one discharge device via which the bulk material can be removed from the container, wherein the discharge device is arranged below the filling opening, and further comprising at least one feed, via which a cleaning liquid can be introduced into the container, wherein the feed is arranged above the discharge device and wherein no stirring blades are provided in an upper region of the container, wherein the apparatus comprises a filter device inside the container which is arranged to substantially retain the bulk material, wherein an outlet opening is arranged to separate the cleaning liquid from the bulk material, wherein the container has a polygonal cross section when viewed along the axis of rotation of the at least one stirring device, and wherein the container has one or more edge regions extending from a cylindrical central part to form the polygonal cross section, the cylindrical central part being accessible by stirring blades of the at least one stirring device, and the edge regions being inaccessible by the stirring blades of the at least one stirring device.

2. Apparatus according to claim 1, wherein the discharge device comprises a worm conveyor which conveys the bulk material.

3. Apparatus according to claim 1, wherein the discharge device comprises an opening provided in a side wall of the container.

4. Apparatus according to claim 1, wherein the at least one stirring device comprises a plurality of stirring blades extending in a radial direction of the container.

5. Apparatus according to claim 1, wherein the upper region of the container is between 15% and 50%.

6. Apparatus according to claim 1, further comprising a control device that ensures that a filling level of the liquid inside the container is between 20% and 70%.

7. Apparatus according to claim 1, wherein the outlet opening is below the filter device, via which cleaning liquid can be removed from the container.

8. Apparatus according to claim 1, wherein the at least one stirring device has a transition section which widens from top to bottom.

9. Apparatus according to claim 1, wherein the at least one feed that introduces the cleaning liquid is positioned above the container.

10. Apparatus according to claim 1, wherein the upper region of the container provides a zone for pre-treating the bulk material in a location above the stirring blades.

11. Apparatus according to claim 10, wherein the zone for pre-treating the bulk material acts as a pre-cleaning zone.

12. Apparatus according to claim 10, wherein the zone for pre-treating the bulk material acts as a pre-heating zone.

13. Apparatus according to claim 5, wherein the upper region of the container is between 20% and 40% of the volume of the container.

14. Apparatus according to claim 5, wherein the upper region of the container is between 30% and 40% of the volume of the container.

15. Apparatus according to claim 6, wherein the control device ensures a filling level of between 30% and 60%.

16. Apparatus according to claim 6, wherein the control device ensures a filling level of between 40% and 50%.

17. Apparatus according to claim 1 wherein the container has a polygonal cross section across a horizontal plane of the container.

* * * * *